(12) United States Patent
Gäbler et al.

(10) Patent No.: US 10,330,273 B2
(45) Date of Patent: Jun. 25, 2019

(54) LIGHTING APPARATUS (71) Applicant: OSRAM GmbH, Munich (DE)

(72) Inventors: Volker Gäbler, Berlin (DE); Jan Oliver Drumm, Regensburg (DE)

(73) Assignee: OSRAM GMBH, Munich (DE)

( * ) Notice: Subject to any disclaimer, the term of this patent is extended or adjusted under 35 U.S.C. 154(b) by 144 days.

(21) Appl. No.: 15/517,521

(22) PCT Filed: Sep. 28, 2015

(86) PCT No.: PCT/EP2015/072210
§ 371 (c)(1),
(2) Date: Apr. 7, 2017

(87) PCT Pub. No.: WO2016/055291
PCT Pub. Date: Apr. 14, 2016

(65) Prior Publication Data
US 2017/0307161 A1    Oct. 26, 2017

(30) Foreign Application Priority Data
Oct. 7, 2014   (DE) .................. 10 2014 220 276

(51) Int. Cl.
*F21V 9/14*    (2006.01)
*F21S 41/135*    (2018.01)
(Continued)

(52) U.S. Cl.
CPC ............ *F21S 41/135* (2018.01); *F21S 41/14* (2018.01); *F21S 41/16* (2018.01); *F21S 41/285* (2018.01);
(Continued)

(58) Field of Classification Search
CPC .......... F21S 41/135; F21S 41/14; F21S 41/16; F21S 41/37; F21S 45/47; F21S 41/285;
(Continued)

(56) References Cited

U.S. PATENT DOCUMENTS

2010/0327745 A1    12/2010  Dassanayake et al.
2011/0292636 A1    12/2011  Fukai et al.
(Continued)

FOREIGN PATENT DOCUMENTS

| DE | 102012209593 A1 | 12/2013 |
| EP | 2525140 A2 | 11/2012 |
| WO | 2013182450 A1 | 12/2013 |

OTHER PUBLICATIONS

German Search Report based on application No. 10 2014 220 276.0 (8 pages) dated Jun. 26, 2015.
(Continued)

*Primary Examiner* — Bao Q Truong
(74) *Attorney, Agent, or Firm* — Viering, Jentschura & Partner MBB (57) ABSTRACT

A lighting apparatus including a light generating device and at least one light wavelength conversion element and also at least one light directing means is provided. The light generating device and the at least one light directing means are configured in such a way that linearly polarized light is generated and directed from different directions to the at least one light wavelength conversion element, such that the linearly polarized light impinges on a surface of the at least one light wavelength conversion element from different directions in each case at an angle of incidence which corresponds to a Brewster angle, wherein the polarization direction of the linearly polarized light is parallel to the plane of incidence thereof.

13 Claims, 7 Drawing Sheets

(51) Int. Cl.
*F21V 9/30* (2018.01)
*F21S 41/14* (2018.01)
*F21S 45/47* (2018.01)
*G02B 27/09* (2006.01)
*F21S 41/37* (2018.01)
*F21S 41/20* (2018.01)
*G02B 19/00* (2006.01)
*G02B 5/30* (2006.01)
*F21S 41/16* (2018.01)
*F21Y 115/30* (2016.01)

(52) U.S. Cl.
CPC ............... *F21S 41/37* (2018.01); *F21S 45/47* (2018.01); *F21V 9/14* (2013.01); *F21V 9/30* (2018.02); *G02B 5/3066* (2013.01); *G02B 19/0057* (2013.01); *G02B 27/0905* (2013.01); *G02B 27/0938* (2013.01); *F21Y 2115/30* (2016.08)

(58) Field of Classification Search
CPC ........... F21V 9/30; F21V 9/14; G02B 5/3066; G02B 19/0057; G02B 27/0905; G02B 27/0938; F21Y 2115/30
See application file for complete search history.

(56) References Cited

U.S. PATENT DOCUMENTS

| | | | |
|---|---|---|---|
| 2012/0051074 A1* | 3/2012 | Takahashi | F21V 13/00 362/509 |
| 2012/0106189 A1* | 5/2012 | Takahashi | B60Q 1/0035 362/538 |
| 2012/0294023 A1* | 11/2012 | Nakazato | F21S 41/125 362/510 |
| 2013/0314896 A1* | 11/2013 | Finsterbusch | G03B 21/204 362/84 |
| 2014/0168940 A1* | 6/2014 | Shiomi | B60Q 1/0023 362/84 |
| 2015/0167905 A1 | 6/2015 | Khrushchev | |

OTHER PUBLICATIONS

International Search Report based on application No. PCT/EP2015/072210 (6 pages) dated Nov. 4, 2015.

* cited by examiner

LIGHTING APPARATUS

RELATED APPLICATIONS

The present application is a national stage entry according to 35 U.S.C. § 371 of PCT application No.: PCT/EP2015/072210 filed on Sep. 28, 2015, which claims priority from German application No. 10 2014 220 276.0 filed on Oct. 7, 2014, and is incorporated herein by reference in its entirety.

TECHNICAL FIELD

The present disclosure relates to a lighting apparatus according to the preamble of claim 1.

BACKGROUND

A lighting apparatus of this type is disclosed for example in the published patent application WO 2013/182450 A1. Said document describes a lighting apparatus including a plurality of laser light sources, the light of which is directed via a ring-shaped reflector onto a light wavelength conversion element.

SUMMARY

It is an object of the present disclosure to provide a lighting apparatus of the generic type which enables a high irradiance, as homogeneous illumination of the light wavelength conversion element as possible and low light losses.

This object is achieved according to the present disclosure by means of a lighting apparatus having the features from claim 1. Particularly advantageous embodiments of the present disclosure are described in the dependent claims.

The lighting apparatus according to the present disclosure has a light generating device and at least one light wavelength conversion element and also at least one light directing means, wherein the light generating device and the at least one light directing means are configured in such a way that linearly polarized light is generated and directed from different directions to the at least one light wavelength conversion element, such that the linearly polarized light impinges on a surface of the at least one light wavelength conversion element in each case at an angle of incidence which corresponds to a Brewster angle, in particular a Brewster angle of the at least one light wavelength conversion element, wherein the polarization direction of the light is parallel to the plane of incidence thereof, wherein the plane of incidence is defined by the perpendicular to the surface of the light wavelength conversion element and by the direction of propagation of the laser light beam impinging on said surface.

The use of linearly polarized light which impinges on a surface of the at least one light wavelength conversion element from different directions at a Brewster angle and is polarized parallel to the plane of incidence thereof enables a high irradiance and homogeneous illumination of the at least one light wavelength conversion element and low light losses. In particular, the abovementioned combination of angle of incidence and polarization direction of the light reduces losses as a result of reflection at the surface of the at least one light wavelength conversion element, such that the majority of the light intensity can penetrate into the at least one light wavelength conversion element. By virtue of the fact that the linearly polarized light impinges on the surface of the at least one light wavelength conversion element from different directions, a homogeneous illumination of the at least one light wavelength conversion element with high irradiance and a correspondingly homogeneous light wavelength conversion are made possible.

Advantageously, the light generating device and the at least one light directing means of the lighting apparatus according to the present disclosure are configured in such a way that the linearly polarized light coming from different directions overlaps on the surface of the at least one light wavelength conversion element. As a result, a particularly high irradiance can be achieved in the overlap region. Moreover, as a result, even in the case of light beams having a non-rotationally symmetrical beam profile, it is possible to generate a virtually homogeneous luminous spot on the surface of the at least one light wavelength conversion element.

Advantageously, at least the at least one light directing means and also the at least one light wavelength conversion element of the lighting apparatus according to the present disclosure are arranged on a common carrier. As a result, a precise spatial position and alignment of the abovementioned components of the lighting apparatus according to the present disclosure relative to one another can be ensured. Advantageously, for the purpose mentioned above, in addition the light generating device is also arranged on the common carrier.

Advantageously, the light generating device and the at least one light directing means and also the at least one light wavelength conversion element of the lighting apparatus according to the present disclosure are arranged on a mounting surface of the common carrier, said mounting surface advantageously being embodied in a planar fashion. As a result, the abovementioned components of the lighting apparatus according to the present disclosure can be embodied as surface-mounted components and be fitted on the common carrier for example already during their production. Moreover, as a result, a particularly precise alignment of the abovementioned components of the lighting apparatus according to the present disclosure relative to one another can also be ensured.

The lighting apparatus according to the present disclosure advantageously has polarization means for influencing the polarization direction of the light generated by the light generating device. By means of the polarization means, the polarization direction of the light generated by the light generating device can be influenced in a simple manner in such a way that the light impinging on the surface of the at least one light wavelength conversion element from different directions is linearly polarized parallel to the plane of incidence thereof.

Advantageously, the light generating device of the lighting apparatus according to the present disclosure has a plurality of laser light sources in order, in a simple manner, by means of a corresponding spatial arrangement and alignment of the laser light sources, to generate polarized light with high luminance which can be directed onto the at least one light wavelength conversion element from different directions and the polarization direction of which can be changed, if appropriate, with the aid of polarization means, such that the laser light impinging on the surface of the at least one light wavelength conversion element is polarized parallel to the plane of incidence thereof. The laser light sources are advantageously embodied as laser diodes in order to enable a compact, space-saving embodiment of the light generating device of the lighting apparatus according to the present disclosure.

Advantageously, each laser light source is assigned a light directing means which is provided with a reflection surface and which is embodied in such a way that light from the respective laser light source is reflected onto the at least one light wavelength conversion element by means of the reflection surface of the light directing means assigned to said laser light source. Alternatively or supplementarily, refractive optical units can also be used for beam deflection. The use of a dedicated light directing means for each laser light source has the advantage that the light emitted by the respective laser light source can be directed in a simple manner and without detours directly to the at least one light wavelength conversion element.

The abovementioned reflection surfaces of the light directing means of the lighting apparatus according to the present disclosure are advantageously inclined relative to the mounting surface of the common carrier in each case by an angle W, wherein said angle W is calculated as $W=45°+WB/2$, and wherein WB denotes the Brewster angle of the at least one light wavelength conversion element. This embodiment of the reflection surfaces makes it possible, using simple means, to achieve the effect that light emitted by the laser light sources parallel to the mounting surface of the common carrier is reflected at the reflection surfaces of the light directing means, such that it impinges on the surface of the at least one light wavelength conversion element at the Brewster angle and the least possible losses as a result of light reflection at the surface of the light wavelength conversion element occur as a result. Alternatively, light refracting surfaces of the refractive optical units mentioned above can also be embodied in such a way that the light emitted by the respective laser light source is directed to the at least one light wavelength conversion element, such that it impinges on a surface of the at least one light wavelength conversion element at the Brewster angle. The use of reflection surfaces in the light directing means, compared with the use of light refracting surfaces in the case of refractive optical units, has the advantage of a higher efficiency since no losses as a result of light absorption occur.

Advantageously, the laser light sources of the lighting apparatus according to the present disclosure are arranged around the at least one light wavelength conversion element, along at least one fictitious closed mathematical curve, on the mounting surface of the common carrier, and wherein each laser light source and the light directing means assigned thereto are arranged advantageously collinearly with the at least one light wavelength conversion element, in order to ensure as homogeneous illumination of the at least one light wavelength conversion element as possible.

Advantageously, the light generating device of the lighting apparatus according to the present disclosure is configured to generate linearly polarized light having a wavelength from the wavelength range of 380 nanometers to 490 nanometers, and the at least one light wavelength conversion element of the lighting apparatus according to the present disclosure is advantageously configured to convert light from the aforementioned wavelength range proportionally into light of a different wavelength having an intensity maximum in the wavelength range of 560 nanometers to 590 nanometers. White light which is a mixture of reflected or scattered, non-converted blue light and emitted, converted yellow light can be generated in a simple manner as a result. In order to achieve a high luminance, the light generating device of the lighting apparatus according to the present disclosure advantageously contains laser diodes which, during their operation, emit blue, linearly polarized light which is converted proportionally into yellow light by means of the at least one light wavelength conversion element, such that the mixture of non-converted blue laser light and laser light converted into yellow light at the light wavelength conversion element produces white light.

The common carrier advantageously includes a heat sink or is embodied as a heat sink in order to enable a cooling of the at least one light wavelength conversion element and advantageously in addition also a cooling of the laser light sources.

Advantageously, the at least one light wavelength conversion element is arranged on a light reflecting surface section of the common carrier. As a result, the efficiency of the lighting apparatus according to the present disclosure is increased because both the non-converted light penetrating into the at least one light wavelength conversion element and the light converted in the at least one light wavelength conversion element are reflected back into the at least one light wavelength conversion element at the light reflecting surface section of the common carrier and, as a result, can leave the at least one light wavelength conversion element only through the surface at the side facing away from the carrier, which also serves for coupling in light.

The lighting apparatus according to the present disclosure is advantageously surrounded by a housing in order to enable protection against damage and contamination.

The lighting apparatus according to the present disclosure is advantageously embodied as part of a motor vehicle headlight and, in the motor vehicle headlight, serves as a light source for generating white light.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the disclosed embodiments. In the following description, various embodiments described with reference to the following drawings, in which.

DETAILED DESCRIPTION

Figure 1:
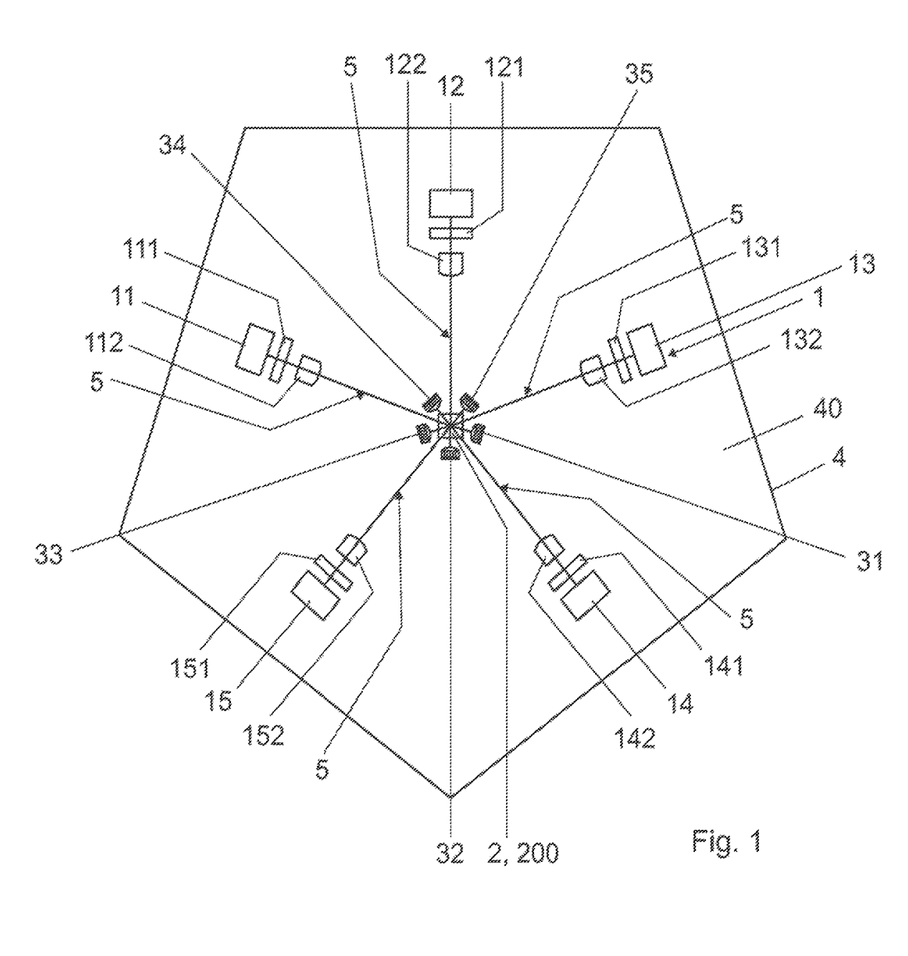
FIG. 1 shows a plan view of the lighting apparatus in accordance with one preferred exemplary embodiment of the present disclosure in a schematic illustration.

The lighting apparatus in accordance with the preferred embodiment of the present disclosure is part of a motor vehicle headlight and has a light generating device 1, a light wavelength conversion element 2, light directing means 31, 32, 33, 34, 35 and a common carrier 4 for the aforementioned components of the lighting apparatus. In addition, the lighting apparatus includes a monitoring unit 5 for the light generating device 1.

The light generating device 1 has five laser diodes 11, 12, 13, 14, 15 of identical type, which are arranged along a fictitious circle at the corners of a fictitious regular pentagon on a mounting surface 40 of the common carrier 4. During their operation, the laser diodes 11, 12, 13, 14, 15 in each case generate blue light having a wavelength of 450 nanometers and an electrical power in the range of 2 watts to 3 watts. They are embodied in each case as a so-called SMT package (SMT=surface mounted technology) and are soldered directly onto the mounting surface 40 of the common carrier 4.

In addition, the light generating device 1 includes five retardation plates 111, 121, 131, 141, 151 and five collimators 112, 122, 132, 142, 152, which are arranged in each case in the light beam path of one of the laser diodes 11, 12, 13, 14 and 15, respectively. The retardation plates 111, 121, 131, 141, 151 are embodied in each case as a so-called λ/2 plate that rotates the polarization direction of the light emitted by the laser diode, in the light beam path of which light the λ/2 plate is arranged, by an angle of 90 degrees. The collimators 112, 122, 132, 142, 152 reduce the divergence of the light emitted by the respective laser diode.

The light wavelength conversion element 2 consists of cerium-doped yttrium aluminum garnet (YAG:Ce), arranged on a light reflecting metallic layer 20 on the mounting surface 40 of the common carrier 4. The light wavelength conversion element 2 is embodied as a square sheet having an area of approximately 4 mm$^2$. Its thickness or its height above the light reflecting metallic layer 20 is approximately 35 micrometers. The light wavelength conversion element 2 is arranged at the center of the fictitious regular pentagon formed by the five laser diodes 11, 12, 13, 14, 15.

The light directing means 31, 32, 33, 34, 35 are arranged along a fictitious circle around the light wavelength conversion element 2, at the corners of a fictitious regular pentagon on the mounting surface 40 of the common carrier 4. The light wavelength conversion element 2 is situated at the center of the fictitious regular pentagon formed by the light directing means 31, 32, 33, 34, 35 and also at the center of the fictitious regular pentagon formed by the laser diodes 11, 12, 13, 14, 15. Each laser diode is assigned one of the cylindrical reflectors. In particular, the first laser diode 11 is assigned the first light directing means 31, the second laser diode 12 is assigned the second light directing means 32, the third laser diode 13 is assigned the third light directing means 33, the fourth laser diode 14 is assigned the fourth light directing means 34 and the fifth laser diode 15 is assigned the fifth light directing means 35. The first laser diode 11 and the first light directing means 31 are arranged collinearly with the light wavelength conversion element 2 on the mounting surface 40 of the common carrier 4. That is to say that the first laser diode 11, the light wavelength conversion element 2 and the first light directing means 31 are arranged along a fictitious straight line on the mounting surface 40 of the common carrier 4. The light wavelength conversion element 2 is situated between the first laser diode 11 and the first light directing means 31 on the mounting surface 40 of the common carrier 4. Likewise, the second laser diode 12 and the second light directing means 32, the third laser diode 13 and the third light directing means 33, the fourth laser diode 14 and the fourth light directing means 34, and also the fifth laser diode 15 and the fifth light directing means 35 are arranged in each case collinearly with the light wavelength conversion element 2 on the mounting surface 40 of the common carrier 4, wherein the light wavelength conversion element 2 is in each case arranged between the respective laser diode and the light directing means assigned thereto.

The light directing means 31, 32, 33, 34, 35 are embodied in each case as cylindrical reflectors. The cylindrical reflectors 31, 32, 33, 34, 35 consist of plastic, alternatively of glass or a plastic-glass composite body, and each have a light reflecting reflection surface 310 facing the light wavelength conversion element 2 and the laser diode assigned thereto. The reflection surface 310 is formed by a light reflecting coating 311 on the transparent material of the respective cylindrical reflector. The reflection surface 310 of the cylindrical reflectors 31, 32, 33, 34, 35 forms a respective angle W with the mounting surface 40 of the common carrier 4, said angle being calculated as $W=45°+WB/2$, wherein WB denotes the Brewster angle of the light wavelength conversion element 2. The Brewster angle WB of the light wavelength conversion element 2 has a value of approximately 60°. The cylindrical reflectors 31, 32, 33, 34, 35 are embodied as plastic injection-molded parts. They can also be produced as an integral injection-molded part, with the advantage of a tighter alignment tolerance with respect to the laser light sources and the carrier element (4).

The carrier 4 is embodied as a mounting plate and has a mounting surface 40, on which all components of the lighting apparatus in accordance with the preferred embodiment of the present disclosure are mounted. The carrier 4 embodied as a mounting plate has the contour of a regular pentagon. In addition to the laser diodes 11, 12, 13, 14, 15, the light wavelength conversion element 2 and the light directing means 31, 32, 33, 34, 35, components of an operating device (not depicted) for the laser diodes 11, 12, 13, 14, 15 are arranged on the mounting surface 40 of the carrier 4, said components being connected to the laser diodes 11, 12, 13, 14, 15 by conductor tracks likewise arranged on the carrier 4. Moreover, the carrier 4 is configured as a heat sink for the laser diodes 11, 12, 13, 14, 15 arranged on its mounting surface 40 and for the light wavelength conversion element 2 and also for the components of the operating device (not depicted).

The functioning of the lighting apparatus in accordance with the preferred embodiment of the present disclosure is explained in greater detail below.

Figure 5:
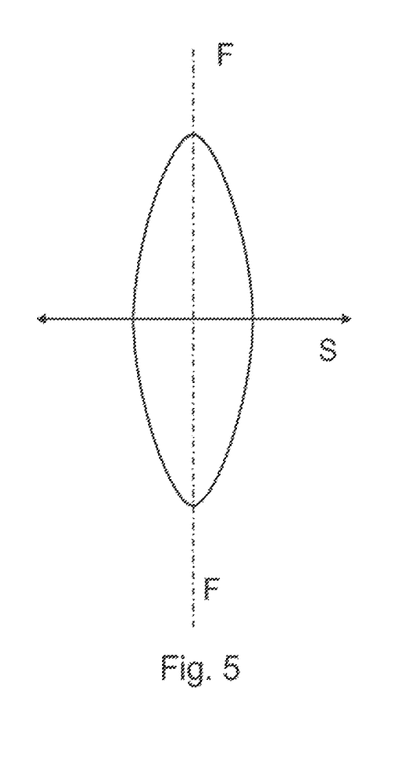
FIG. 5 shows a schematic illustration of the laser beam profile of a laser light source of the lighting apparatus depicted in the figure.

The five laser diodes 11, 12, 13, 14, 15 in each case generate blue light having a wavelength of 450 nanometers, which is emitted in each case parallel to the mounting surface 40. The light emitted by the five laser diodes 11, 12, 13, 14, 15 has in each case an elliptical profile having a fast axis F oriented perpendicularly to the mounting surface 40 of the carrier and is linearly polarized in each case parallel to the mounting surface 40. FIG. 5 schematically illustrates the fast axis F-F and the polarization direction S of the laser light emitted by a laser diode 11. All the other laser diodes emit laser light having the same properties with regard to profile, fast axis and polarization.

Figure 6:
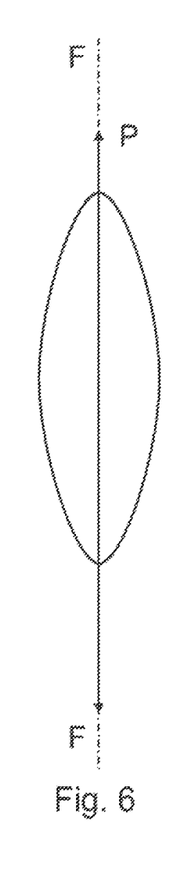
FIG. 6 shows a schematic illustration of the laser beam profile of a laser light source of the lighting apparatus depicted in the figure after rotation of the polarization direction.

With the aid of the retardation plates 111, 121, 131, 141, 151 embodied as λ/2 plates, the polarization direction of the light emitted by the laser diodes 11, 12, 13, 14, 15 is rotated in each case by 90 degrees, such that the polarization direction P of the laser light in each case corresponds to the fast axis F-F. FIG. 6 schematically illustrates the fast axis F-F and the polarization direction P of the laser light emitted by the laser diode 11 after passing through the retardation plate 111. Fast axis F-F and polarization direction P are oriented perpendicularly to the mounting surface 40 after passage through the retardation plate 111. Analogously thereto, the laser light emitted by the other laser diodes 12, 13, 14, 15 is also rotated by 90 degrees in each case by means of a retardation plate 121, 131, 141, 151, such that its polarization direction corresponds to the fast axis and is polarized perpendicularly to the mounting plate 40.

With the aid of the collimators 112, 122, 132, 142, 152, the divergence of the light emitted by the laser diodes 11, 12, 13, 14, 15 is reduced in each case, such that overall five laser beams running parallel to the mounting surface 40 are generated, said laser beams being directed respectively onto the reflection surface 310 of one of the light directing means 31, 32, 33, 34, 35. The parallelism relates to the extension plane of the carrier element (4) and the optical main direction of propagation of the respective laser beams.

Figure 2:
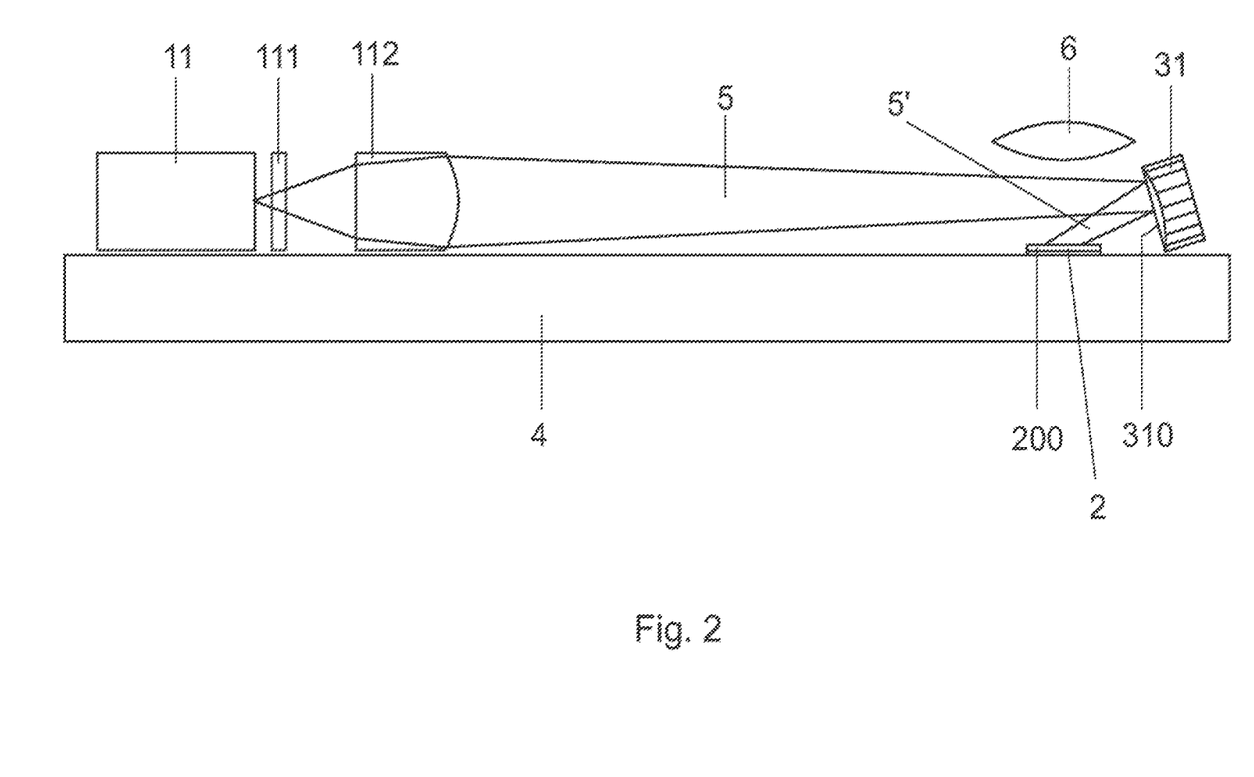
FIG. 2 shows a cross section through a unit of the lighting apparatus depicted in FIG. 1 in a schematic illustration.
Figure 3:
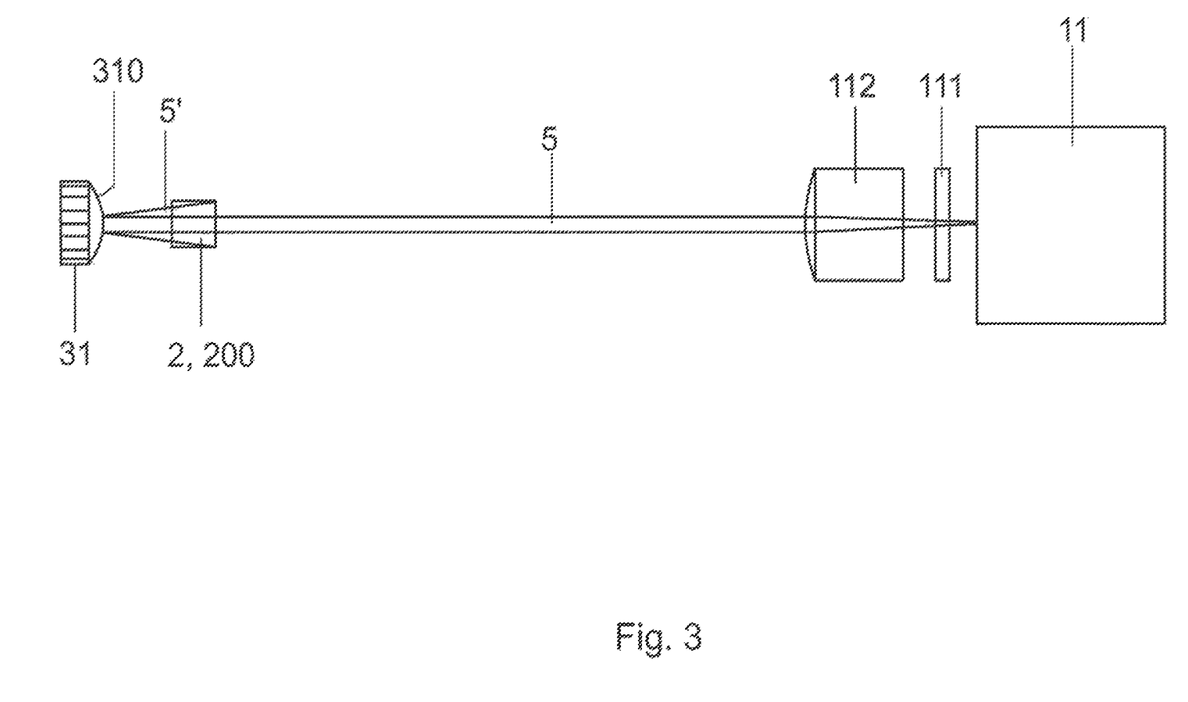
FIG. 3 shows a plan view of the unit depicted in FIG. 2 in a schematic illustration.
Figure 4:
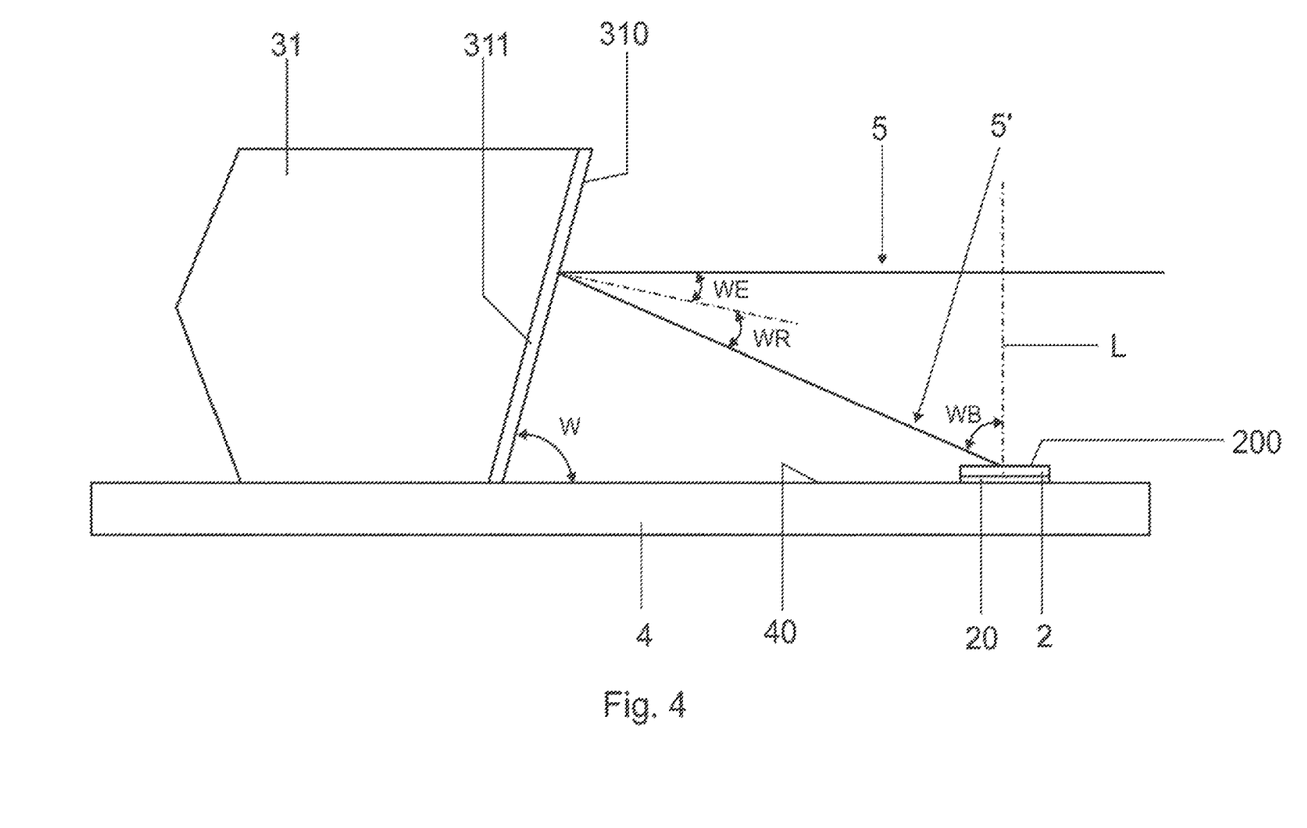
FIG. 4 shows a cross section through a light directing means and the light wavelength conversion element and also the common carrier of the lighting apparatus depicted in FIG. 1.

FIG. 2 schematically illustrates, on the basis of the example of the first laser diode 11, the first retardation plate 111, the first collimator 112, the first light directing means 31 and the light wavelength conversion element 2, the light beam path of the laser light generated by the first laser diode 11. The laser light beam 5 generated by the first laser diode 11 passes through the first retardation plate 111 and the first collimator 112 and impinges on the reflection surface 310 of the first light directing means 31 embodied as a cylindrical reflector. At the reflection surface 310 of the first light directing means 31, the laser light beam 5 emitted by the first laser diode 11 is reflected in the direction of the light wavelength conversion element 2. The reflection surface 310 of the first light directing means 31 is curved in such a way that the laser light beam 5 is fanned out at the reflection surface 310 parallel to the mounting surface 40 and perpendicularly to the direction of light propagation, in order thus to be able to illuminate the largest possible portion of the surface 200 of the light wavelength conversion element 2. The fan-out of the laser light beam is illustrated schematically in the plan view in FIG. 3. Moreover, the reflection surface 310 forms an angle W with the mounting surface 40 of the carrier 4 and the surface 200 of the light wavelength conversion element 2 arranged on the mounting surface 40. FIG. 4 shows a cross section through the reflection surface 310 of the first light directing means 31 and the light wavelength conversion element 2 and also the carrier 4 in a schematic illustration.

The laser light beam 5 emitted by the first laser diode 11 runs parallel to the mounting surface 40 of the carrier 4 and impinges on the reflection surface 310 of the first light directing means at the angle of incidence WE=90°−W. At the reflection surface 310, the laser light beam 5 is reflected at the angle of reflection WR=WE in the direction of the light wavelength conversion element 2. The part 5' of the laser light beam 5 of the first laser diode 11 that is reflected at the reflection surface 310 impinges on the surface 200 of the light wavelength conversion element 2 at the Brewster angle WB of the light wavelength conversion element, since the reflection surface 310 forms an angle W with the mounting surface 40, said angle being calculated as W=45°+WB/2. Since the laser light beam 5 in accordance with the schematic illustration in FIG. 6 is linearly polarized perpendicularly to the mounting surface 40, the part 5' of the laser light beam 5 that is reflected at the reflection surface 310, upon impinging on the surface 200 of the light wavelength conversion element 2, is linearly polarized parallel to the plane of incidence thereof (p-polarized), and can therefore penetrate into the light wavelength conversion element 2 without high reflection losses. Said plane of incidence is spanned by the perpendicular L to the surface 200 of the light wavelength conversion element 2 and by the direction of propagation of the part 5' of the laser light beam 5 that impinges on the surface 200 and is reflected at the reflection surface 310.

At the light wavelength conversion element 2, the part 5' of the laser light beam 5 is proportionally converted into light of a different wavelength having an intensity maximum in the wavelength range of 560 nanometers to 590 nanometers, which corresponds to the spectral range of yellow light. From the surface 200 of the light wavelength conversion element 2, therefore, white light is emitted in all directions with a quasi-Lambertian distribution, said white light being a mixture of non-converted blue light and converted yellow laser light. The relative proportion of converted yellow and non-converted blue light is dependent on the layer thickness of the light wavelength conversion element 2 and on the cerium concentration in the yttrium aluminum garnet of the light wavelength conversion element 2. The white light emitted from the surface 200 of the light wavelength conversion element 2 is projected onto the roadway in front of the vehicle by means of an optical unit 6 positioned above the light wavelength conversion element 2, which optical unit is illustrated schematically in FIG. 2 and may include a plurality of optical lenses or reflectors.

The light reflecting metallic layer 20 between the light wavelength conversion element 2 and the mounting surface 40 of the carrier 4 increases the system efficiency because both non-converted blue light and converted yellow light are reflected at the metallic layer 20, such that said light can leave the light wavelength conversion element 2 at the surface 200. Moreover, the metallic layer 20 improves the cooling of the light wavelength conversion element 2.

Analogously to the arrangement of first laser diode 11, first retardation plate 111, first collimator 112 and first light directing means 31 as described in greater detail above, the second laser diode 12, the second retardation plate 121, the second collimator 122 and the second light directing means 32 are also arranged with respect to the light wavelength conversion element 2 on the mounting surface 40 of the carrier 4. In particular, the laser light beam generated by the second laser diode 12 is reflected onto the surface 200 of the light wavelength conversion element 2 by means of the second light directing means 32, wherein the second retardation plate 112 rotates the polarization direction of the laser light beam by 90 degrees, such that, upon impinging on the surface 200 of the light wavelength conversion element 2, it is polarized parallel to the plane of incidence (p-polarized), and wherein the reflection surface 310 of the second light directing means 32 likewise forms the angle W with the mounting surface 40, such that the laser light beam emitted by the second laser diode 12 likewise impinges on the surface 200 of the light wavelength conversion element 2 at the Brewster angle WB.

The other laser diodes 13, 14 and 15 and the retardation plates 131, 141 and 151, respectively, collimators 132, 142 and 152, respectively, and light directing means 33, 34 and 35, respectively, assigned thereto are also arranged and configured analogously thereto. The illustrations in FIGS. 2, 3 and 4 are therefore representative of each of the five laser diodes 11 to 15 and the components assigned thereto, consisting of the respective retardation plate, the respective collimator and the respective light directing means.

Figure 7:
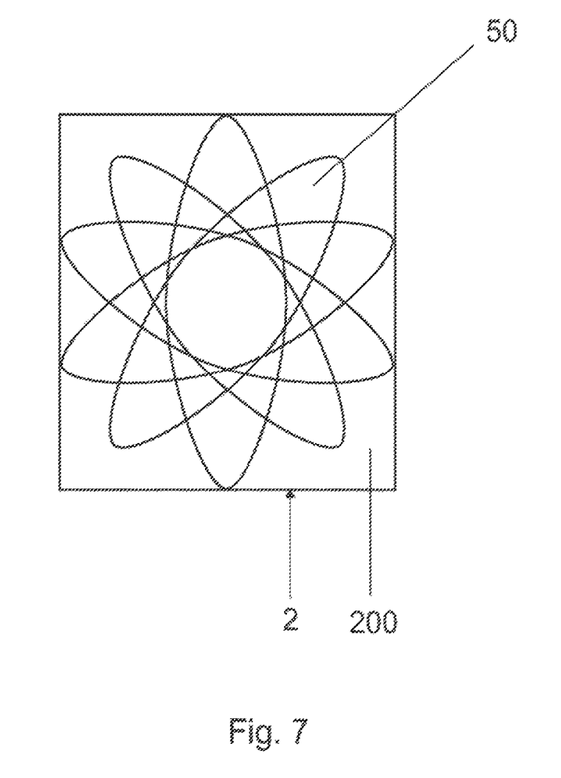
FIG. 7 shows a plan view of the illuminated surface of the light wavelength conversion element of the lighting apparatus depicted in FIG. 1.

As is illustrated schematically in FIG. 1, the laser light emitted by the five laser diodes 11, 12, 13, 14, 15 is reflected onto the surface 200 of the light wavelength conversion element 2 in each case via the reflection surface 310 of a light directing means 31, 32, 33, 34, 35. The laser diodes 11, 12, 13, 14, 15 are arranged at the vertices of a fictitious regular pentagon and the respective light directing means 31, 32, 33, 34 and 35 respectively assigned to the laser diodes 11, 12, 13, 14, 15 is arranged in each case collinearly with the light wavelength conversion element 2 and the corresponding laser diode on the mounting surface 40 of the carrier 4. On account of this arrangement, the laser light beams emitted by the laser diodes 11, 12, 13, 14, 15 parallel to the mounting surface 40 impinge on the surface 200 of the light wavelength conversion element 2 from different directions. In particular, the directions of incidence of the parts 5' of the laser light beams 5 that are reflected at the reflection surfaces 310 of the five light directing means 31, 32, 33, 34, 35 in each case form an angle of 72 degrees with one another, such that the five laser light beams 5 with their elliptical profiles are superimposed on the surface 200 of the light wavelength conversion element 2. FIG. 7 schematically illustrates this superimposition of the five laser light beams 5 on the surface 200 of the light wavelength conversion element 2. The luminous spot 50 generated on the surface 200 of the light wavelength conversion element 2 has a contour which arises as a result of the superimposition of the laser light beams 5 with emission direction angularly offset by 72 degrees in each case and the arrangement of the laser diodes 11, 12, 13, 14, 15 and of the light directing means 31, 32, 33, 34, 35 assigned thereto and also as a result of the elliptical profile of the laser light beams 5. As a result of the superimposition of the laser light beams respectively offset by 72 degrees on the conversion element, a light emission of the conversion element is generated which results from the superimposition of the five individual quasi-Lambertian light emission characteristics.

Figure 8:
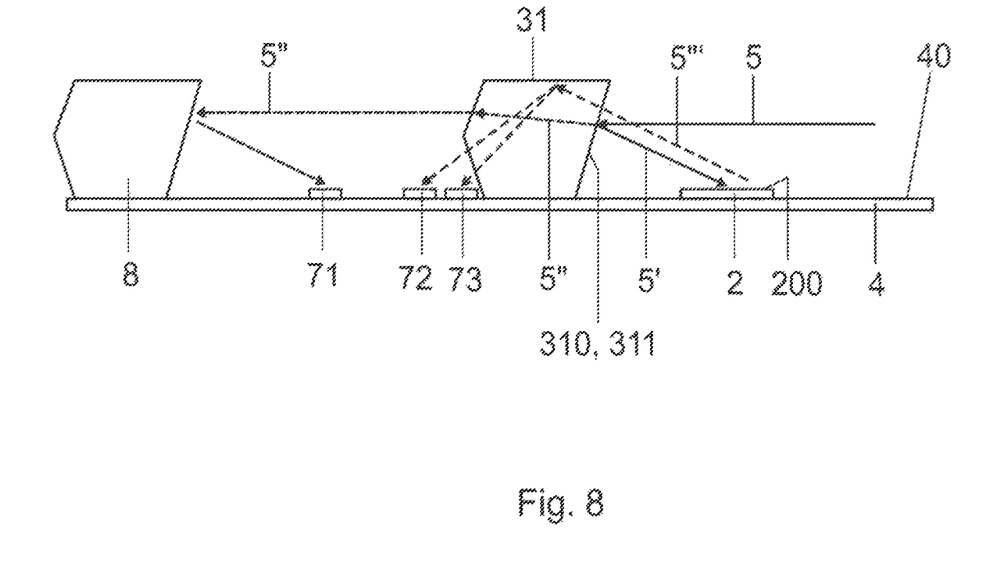
FIG. 8 shows a cross section through a light directing means, the light wavelength conversion element and a monitoring unit and also the common carrier of the lighting apparatus depicted in FIG. 1.

The lighting apparatus in accordance with the preferred exemplary embodiment of the present disclosure has, in addition to the components of the lighting apparatus as already described above, elements 71, 72, 73, 8 for monitoring the light emitted by the laser diodes 11, 12, 13, 14, 15 and by the light wavelength conversion element 2. Said elements 71, 72, 73, 8 are illustrated only in FIG. 8 schematically and in an exemplary fashion on the basis of the example of the first laser diode 11 and the first light directing means assigned thereto. These elements have been omitted in the other figures, for the sake of simplicity. Corresponding elements for monitoring are likewise provided for the other laser diodes 12 to 15.

The laser light beam 5 impinging on the reflection surface 310 is reflected for the most part in the direction of the light wavelength conversion element 2. The part 5' of the laser light beam 5 that is reflected at the reflection surface 310 contains more than 95 percent of the light intensity of the laser light beam 5. The reflection surface 310, or the coating 311 of which the reflection surface 310 consists, is partially transparent, such that a part 5" of the laser light beam 5 penetrates into the interior of the first light directing means 31. The part 5" of the laser light beam 5 that is transmitted by the coating 311 has a light intensity of less than 5 percent of the light intensity of the laser light beam 5. The transmitted path 5" passes through the transparent plastic material of the first light directing means 31 and is directed by a deflection reflector 8 onto a first photodiode 71, which is sensitive to light from the blue spectral range and is arranged on the mounting surface 40 of the carrier 4. The laser light emitted by the first laser diode 11 is monitored directly by means of the first photodiode 71. In particular, a defect of the first laser diode 11 or changes in the intensity of the laser light beam 5 emitted by the first laser diode 11 can thereby be detected and, for example, a safety shutdown of the lighting apparatus can be activated. The laser light beams 5 and the reflected part 5' and also the transmitted part 5" of the laser light beams are illustrated in each case in an idealized manner in FIGS. 1, 4 and 8 by means of a line which indicates the directions of propagation of these laser light beams 5, 5' and 5", without taking account of a possible divergence or fan-out of the laser light beams.

Since the coating 311 on the first light directing means 31 is partially transparent, a part of the mixed light 5''' emitted from the surface 200 of the light wavelength conversion element 2 with low intensity also penetrates into the interior of the first light directing means 31 and is reflected back in the direction of the mounting surface 40 of the carrier 4 by total internal reflection at an interface of the first light directing means 31 that runs parallel to the mounting surface 40, and impinges on a second and third photodiode 72, 73, which are likewise arranged on the mounting surface 40 of the carrier 4. The second photodiode 72 is sensitive to light from the yellow spectral range and the third photodiode 73 is sensitive to light from the blue spectral range. The white mixed light emitted by the light wavelength conversion element 2 is monitored with the aid of the second photodiode 72 and third photodiode 73. In particular, by means of the two photodiodes 72, 73, the intensity and the relative proportion of non-converted blue and converted yellow light can be monitored and, if appropriate, a safety shutdown can be initiated or the light intensity of the laser light beam 5 from the first laser light diode 11 can be readjusted. Since three photodiodes and a deflection reflector analogous to the photodiodes 71, 72, 73 and deflection reflector 8 depicted in FIG. 8 are provided for each of the five laser diodes 11, 12, 13, 14, 15, the light intensity of the laser light beam 5 emitted by each individual laser diode 11, 12, 13, 14, 15 can be separately monitored by means of the first photodiode 71, and, by means of the second 72 and third photodiodes 73, which are positioned around the light wavelength conversion element 2 on account of their arrangement illustrated in FIG. 8, in addition a light emission from the surface 200 of the light wavelength conversion element 2 can also be detected and the power of the laser diodes 11, 12, 13, 14, 15 can be correspondingly readjusted by means of a regulating apparatus, if appropriate, in order to regulate the light intensity of the laser light beams 5 emitted by the laser diodes, such that as homogeneous illumination of the surface 200 of the light wavelength conversion element 2 as possible is ensured. As an alternative thereto, the regulating apparatus can be used to individually set the laser power of the laser diodes and thus influence the light emission of the light wavelength conversion element 2.

The dimensions of the lighting apparatus in accordance with the preferred embodiment of the present disclosure are so small that it can be accommodated in a parallelepipedal housing having a square base surface area of 40 mm by 40 mm and a height of 10 mm. In particular, the structural height of the laser diodes 11, 12, 13, 14, 15, retardation plates 111, 121, 131, 141, 151 and light directing means 31, 32, 33, 34, 35 and also further components 71, 72, 73, 8 and also of the components of the operating device (not depicted) which are arranged on the mounting surface 40 of the carrier 4 is less than 10 mm. The carrier 4 can bear for example by its side facing away from the mounting surface 40 on the base surface of the parallelepipedal housing and the optical unit 6 can be integrated in a cover surface of the parallelepipedal housing that is situated opposite the base surface. The base surface of the parallelepipedal housing can for example be embodied as a heat sink and have cooling fins. Alternatively, the lighting apparatus can also be accommodated in a cylindrical housing having a circular-disk-shaped base surface having an area of at least 1600 mm² and a height of 10 mm.

The lighting apparatus in accordance with the preferred embodiment of the present disclosure can be used as a light source in a vehicle headlight on account of its small dimensions.

The present disclosure is not restricted to the embodiment of the present disclosure explained in greater detail above. By way of example, it is possible to change the number, arrangement and constitution of the laser diodes in the lighting apparatus according to the present disclosure. Moreover, the form of the carrier and the configuration of the light directing means can also be adapted to the desired application. Furthermore, the light color of the light emitted by the laser diodes and the properties of the light wavelength conversion element, for example the conversion color or the distribution of the conversion centers in the material of the light wavelength conversion element, can be adapted to the desired application.

The arrangement of the laser diodes, light directing means and sensor apparatus is not restricted to a 5-fold symmetry, but rather can generally have a (2n+1)-fold symmetry, where n=1, 2, 3, . . . etc.

Alternatively, the light wavelength conversion element can be operated in a transmissive arrangement in which the generated mixed light, that is to say the mixture of laser light converted at the light wavelength conversion element and the non-converted laser light, is emitted on the opposite side of the carrier 4 relative to the mounting surface 40. In this case, the light reflecting layer 20 is omitted or replaced by a transparent layer, and the carrier 4 is embodied in a transparent fashion at this location in this case or the carrier 4 has a perforation in which the light wavelength conversion element 2 is arranged.

Furthermore, in the case of a transmissive arrangement, laser light can impinge on the light wavelength conversion element on two sides, by virtue of the laser diodes being arranged on both sides of the carrier and thus irradiating the light wavelength conversion element from both sides. The light emission of the light wavelength conversion element into both half-spaces also takes place in this arrangement.

The terms light, illumination, light losses, light intensity, light color, luminance, etc., as used here, are intended to concomitantly encompass the adequate terms used for the electromagnetic radiation from the non-visible spectral ranges ultraviolet and infrared, such as radiation, irradiation, radiation losses, radiation intensity, radiance. In particular, therefore, the laser diodes can be configured in such a way that they generate ultraviolet laser radiation or infrared laser radiation instead of light.

While the disclosed embodiments have been particularly shown and described with reference to specific embodiments, it should be understood by those skilled in the art that various changes in form and detail may be made therein without departing from the spirit and scope of the disclosed embodiments as defined by the appended claims. The scope of the disclosed embodiments is thus indicated by the appended claims and all changes which come within the meaning and range of equivalency of the claims are therefore intended to be embraced.

The invention claimed is:

1. A lighting apparatus comprising:
   a light generating device;
   at least one light wavelength conversion element; and
   at least one light directing means;
   wherein the at least one light wavelength conversion element, the light generating device, and the at least one light directing means are arranged on a common carrier;
   wherein a reflection surface of the at least one light directing means is inclined relative to a mounting surface of the common carrier in each case by an angle W that is calculated as W=45°+WB/2, wherein WB denotes a Brewster angle of the at least one light wavelength conversion element;
   wherein the light generating device and the at least one light directing means are configured in such a way that linearly polarized light is generated and directed from different directions to the at least one light wavelength conversion element, such that the linearly polarized light impinges on a surface of the at least one light wavelength conversion element from different directions in each case at an angle of incidence which corresponds to a Brewster angle, wherein the polarization direction of the linearly polarized light is parallel to the plane of incidence thereof.

2. The lighting apparatus as claimed in claim 1, wherein the at least one light wavelength conversion element, the light generating device and the at least one light directing means are arranged on the mounting surface of the common carrier.

3. The lighting apparatus as claimed in claim 2, wherein the light generating device comprises a plurality of laser light sources.

4. The lighting apparatus as claimed in claim 3, wherein each laser light source is assigned a light directing means having a reflection surface or having at least one light refracting surface which is configured in such a way that light from the respective laser light source is reflected onto the at least one light wavelength conversion element by means of the reflection surface or by means of the at least one light refracting surface of the light directing means assigned to said laser light source.

5. The lighting apparatus as claimed in claim 3, wherein the laser light sources are arranged around the at least one light wavelength conversion element, along at least one fictitious closed mathematical curve, on the mounting surface of the common carrier, and wherein each laser light source and the light directing means assigned thereto are arranged collinearly with the at least one light wavelength conversion element.

6. The lighting apparatus as claimed in claim 1, wherein provision is made of polarization means for influencing the polarization direction of the linearly polarized light.

7. The lighting apparatus as claimed in claim 1, wherein the light generating device is configured to generate linearly polarized light having a wavelength from the wavelength range of 380 nanometers to 490 nanometers, and the at least one light wavelength conversion element is configured to convert light from the wavelength range proportionally into light of a different wavelength having an intensity maximum in the wavelength range of 560 nanometers to 590 nanometers.

8. The lighting apparatus as claimed in claim 1, wherein the common carrier comprises a heat sink or is embodied as a heat sink.

9. The lighting apparatus as claimed in claim 8, wherein the at least one light wavelength conversion element is arranged on a light reflecting surface section of the common carrier.

10. The lighting apparatus as claimed in claim 8, wherein the at least one light wavelength conversion element is arranged on a transparent surface section of the common carrier.

11. The lighting apparatus as claimed in claim 10, wherein the at least one light wavelength conversion element can be irradiated from both sides.

12. A headlight comprising at least one lighting apparatus, the lighting apparatus comprising,
 a light generating device,
 at least one light wavelength conversion element, and
 at least one light directing means,
 wherein the at least one light wavelength conversion element, the light generating device, and the at least one light directing means are arranged on a common carrier;
 wherein a reflection surface of the at least one light directing means is inclined relative to a mounting surface of the common carrier in each case by an angle W that is calculated as W=45°+WB/2, wherein WB denotes a Brewster angle of the at least one light wavelength conversion element;
 wherein the light generating device and the at least one light directing means are configured in such a way that linearly polarized light is generated and directed from different directions to the at least one light wavelength conversion element, such that the linearly polarized light impinges on a surface of the at least one light wavelength conversion element from different directions in each case at an angle of incidence which corresponds to a Brewster angle, wherein the polarization direction of the linearly polarized light is parallel to the plane of incidence thereof.

13. A lighting apparatus comprising:
 a light generating device comprising a plurality of laser light sources;
 at least one light wavelength conversion element; and
 at least one light directing means assigned to each laser light source of the laser light sources;
 wherein the at least one light wavelength conversion element, the light generating device, and the at least one light directing means are arranged on a common carrier; wherein the plurality of laser light sources are arranged around the at least one light wavelength conversion element, along at least one fictitious closed mathematical curve, on a mounting surface of the common carrier, and where each laser light source of the plurality of laser light sources and the at least one light directing means assigned thereto are arranged collinearly with the at least one light wavelength conversion element;
 wherein the light generating device and the at least one light directing means are configured in such a way that linearly polarized light is generated and directed from different directions to the at least one light wavelength conversion element, such that the linearly polarized light impinges on a surface of the at least one light wavelength conversion element from different directions in each case at an angle of incidence which corresponds to a Brewster angle, wherein the polarization direction of the linearly polarized light is parallel to the plane of incidence thereof.

\* \* \* \* \*